UNITED STATES PATENT OFFICE.

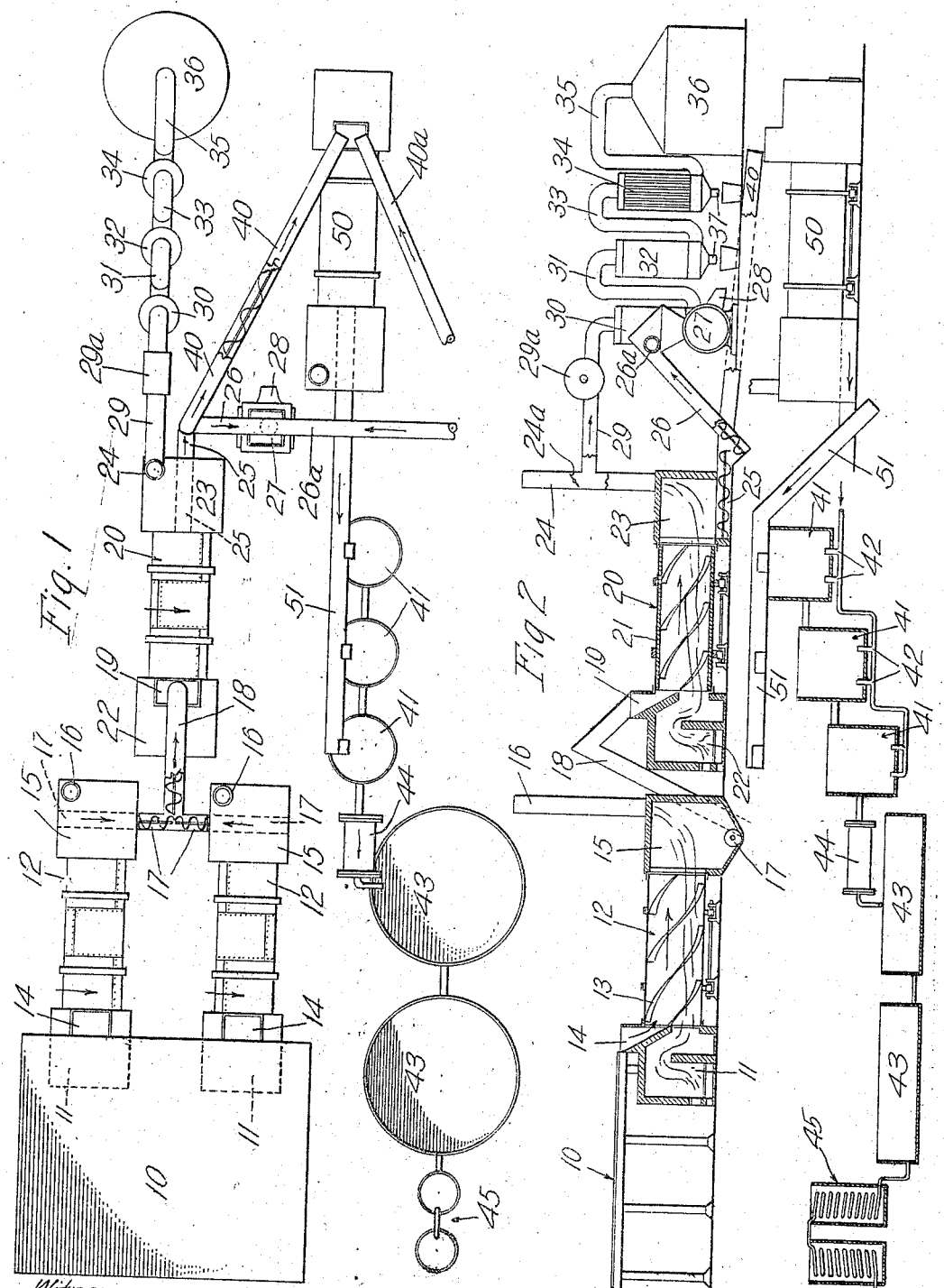

JOHN W. CHENEY, OF LOS ANGELES, CALIFORNIA.

PROCESS FOR TREATING KELP.

1,168,785.  Specification of Letters Patent.  Patented Jan. 18, 1916.

Application filed December 15, 1913. Serial No. 806,716.

*To all whom it may concern:*

Be it known that I, JOHN W. CHENEY, a citizen of the United States, residing at Los Angeles, in the county of Los Angeles, State of California, have invented new and useful Improvements in Processes for Treating Kelp, of which the following is a specification.

This invention relates to a process for treating kelp for the extraction of values therefrom, and particularly for the extraction of fertilizer or mineral salts together with extraction of various other valuable volatile products; and the invention consists in certain sequences of continuous operation upon the kelp, and upon the products thereof as are hereinafter specifically described.

It has been found that kelp, and particularly certain species of kelp, contains a very large percentage of ingredients valuable for different purposes. A typical analysis might show that of the total weight water composes perhaps eighty per cent.; and the remaining solid constituents may be typically analyzed as follows: From one ton of green kelp about 380 pounds of dry product will be obtained; and this 380 pounds may again be divided into about 224 pounds of solid product and about 156 pounds of volatile product. The 224 pounds of solid (which is the substance I may separate for the use as fertilizer) includes about 10 pounds of potassium and sodium sulfates, 38 pounds of other sodium salts, 120 pounds of other potassium salts, about 56 pounds of organic carbon and one pound of iodin. The 156 pounds of volatile substance includes certain substances among which are varnish gum, creosote, alcohol, acetone, and a certain amount of fixed gases which are combustible and consequently of value.

It is the object of the invention to provide a simple process and a simple mechanism for effecting the separation of the kelp into these various constituents and to prepare these various constituents in such form as to be commercially useful.

The following detailed specification explains specifically how this object is accomplished; and the accompanying drawings show a typical plant for practising my preferred form of process.

In the accompanying drawings, Figure 1 is a plan, and Fig. 2 is a longitudinal vertical section, of a plant suitable for carrying out my process.

I will first explain the apparatus and will then explain the details of the operation of my process.

In the drawings the numeral 10 may designate a suitable platform on which the kelp is received, 11 designates furnaces whose heated gases of combustion pass through rotating driers 12. These rotating driers may be rotated from any suitable source of power, being essentially hollow drums with spiral vanes or shelves 13 on their interiors, the drums being rotated in the direction which will gradually feed the kelp through the drums in the direction indicated. Or any other suitable means may be used for exposing the kelp to the heat and feeding it along the apparatus. The kelp is fed to the drums through the charging chutes 14. At the farther end of each drum there is a smoke box or the like 15 into which the heated gases of combustion pass, thence to pass up the stacks 16. The kelp passes also into this box 15, dropping to the bottom where it is engaged by the screw conveyer 17 and carried to an elevator 18. Elevator 18 leads to the charging chute 19 of the roaster 20. This roaster 20 is similar in construction to the driers 12 excepting that it may be constructed for higher temperature and may have an interior lining 21 of fire brick or clay or the like. A furnace 22 is provided to heat the roaster, being in construction similar to furnaces 11, and at the delivery end of the roaster a box 23 is placed with a stack 24. A conveyer 25 in the bottom of the box 23 passes the material to an elevator 26 leading to a grinder or pulverizer 27. The ground or pulverized or otherwise comminuted material may be discharged at 28 ready for use as fertilizer, or may be passed on for further extraction of the values contained therein. A pipe 29 leads from the stack 24 below a damper 24ª therein; and it is designed to pass all or part of the gases through pipe 29. The damper 24ª may be manipulated to obtain a sufficient draft for the furnace; or all the gases may be passed along the pipe 29 by any suitable means, say a blower 29ª.

The pipe 29 leads to a condenser 30 where a certain amount of condensation takes place; a pipe 31 carries the remaining gases and vapors to a second condenser 32, and a pipe 33 may carry the remaining gases and vapors to the third condenser 34. There may be as many condensers arranged in series, or in any other manner, as may be desired; from the final condenser, a pipe 35 may lead to a gas reservoir 36. The condensates may be drawn from the condensers in any desired manner, say from the points 37. The condensates are then ready for use or for further refining, separation, etc.

From the conveyer 25, the conveyer 40 leads to incinerator 50, constructed similarly to roaster 20. The temperature in the incinerator is sufficient to ash the pulp fed thereto. A conveyer 51 leads to digesters 41 which are equipped with steam injector pipes 42. Crystallizing or precipitating vats 43 are connected to receive the solution from the digesters, and a still 45 receives the final liquid. Filter 44 is interposed between the digesters and crystallizing vats. It will be noted that a pair of driers deliver into one roaster; and in a full plant I contemplate having another set of driers and roaster which will deliver to the incinerator or to the grinder through conveyers 26$^a$ or 40$^a$. In such an arrangement each roaster will take the product from two driers and one incinerator will handle the product from two roasters and from four driers.

It will be understood that I explain the apparatus merely as a preferred form in which my process may be successfully practised. The apparatus may be altered and the different mechanisms changed and combined, so long as it suffices for the operations hereinafter described.

I now explain my process in detail. The kelp as it is delivered to receiving platform 10 is preferably cut into short lengths, so that it may be handled easily in bulk. This cutting may be done by any suitable mechanism. The cut kelp is fed through the chutes 14 into the driers 12. Sufficient heat is supplied to the driers to evaporate most or all of the moisture contained within the kelp, so that the material delivered to the conveyer 17 is wholly or practically dried. It is desirable to keep the temperature in the driers at such a point that as large a quantity of water as possible is removed without decomposing the kelp and without removing the values. It will be understood that the kelp must be at least partially dried previously to roasting; the water must be removed before proper decomposition by roasting may take place. The percentage of the total water removed may depend upon operating conditions.

The dried product, some 380 pounds to each ton of green kelp, passes into the roaster 20 where a higher temperature is kept up. The temperature in the roaster is designed to be sufficient for decomposition of the material without burning it. In practice I may keep the temperature as near to the charring temperature as possible. Under the influence of the roasting temperature decomposition of the material takes place and a certain proportion of the constituents is liberated in gaseous and vaporous form, some 156 pounds of the 380 pounds of material. Approximately 224 pounds of material is delivered to conveyer 25 and thence may be taken out to the pulverizer or grinder 27. The gases and vapors are passed through the pipe 29 to the battery of condensers, where fractional condensation takes place. For instance, the temperature in the first condenser may be kept at such a point as to condense the most condensable of the vapors; vapors with a lower condensation temperature will be condensed in the second condenser, and so on. The battery of condensers may be arranged in any manner to condense and separate the various vapors and liquids and solids. The fixed gases pass to a gas receiver 36. These fixed gases contain combustible gases and may be treated in any desired manner and according to any suitable process for separation and use. The products recovered in the condensers include the varnish gum, cresote, acetone and alcohol heretofore mentioned; all of these products are of commercial value.

I have said that the solid product may be withdrawn after the second step of my process—after roasting; but for the further extraction of values it is passed on through other stages of my process. After the volatile and combustible products have been removed by roasting, I may then ash the solid matter without losing any of the valuable constituents. Accordingly I pass the solids to the incinerator 50 where the greater part of organic carbon is consumed and the mineral salts left in ash form ready to be taken up in solution or otherwise. The ash is passed on through the conveyer 40 to digesters 41 where it is treated with warm water. The constant movement of the incinerator drum keeps the material in constant agitation and checks fusing which would otherwise occur; thus allowing the use of a higher temperature than would otherwise be the case. The water may be heated, and the whole mass agitated, by injection of steam at the bottoms of the digesters through pipes 42. The digesters may be arranged in series so that the solution from one may be passed over the solids in the next, and so on, until a saturated solution is had. The saturated solution is withdrawn into crystallizing or precipitating vats 43 where the salts may either be crystallized out at once or may be fractionally crystallized and thus separated, or may be treated in any other manner to extract commercial values. The filter 44 between the digesters and vats insures a pure solution for crystallization, etc. The liquid remaining after crystallization may be passed to a still 45 where the iodin is distilled over. The crystallized salts may be treated in any desired manner to produce or separate commercial salts; the iodin is obtained in uncombined and nearly pure form. The pulp remaining in the digesters after treatment may be removed and used as filler for fertilizer. The salts, etc., obtained from the ash include potassium salts, sodium salts and others.

It will be seen that the above described steps constitute a continuous process capable of extracting all the known valuable ingredients from kelp. By performing operations in the sequence set forth, I am able to save all the values, sacrificing none in order to obtain others. I particularly point to the sequence of drying, roasting and ashing and subsequent operations. The drying operation is necessary in order to carry out the roasting with efficiency. The roasting removes all volatile products which would be otherwise lost in the ashing operation; and the ashing operation therefore wastes none of the values and puts the material into such condition that the salts, etc., are easily extracted. I also particularly point to the fact that my process is continuous, all of the operations being carried on simultaneously. The operations of extraction of salts after ashing are not limited to those described herein; various methods well known to industrial chemistry may be employed for separation and production of commercially valuable products.

I claim:

1. The herein described continuous process of treating kelp or the like, comprising first drying the kelp to remove contained moisture, roasting the dried remainder at a temperature below incineration temperature to drive off volatile products, and then incinerating the remainder of the ash, and keeping the material in constant agitation during incineration, and then dissolving out the mineral salts from the ash.

2. The herein described continuous process of treating kelp or the like, comprising first drying the kelp to remove contained moisture, roasting the dried remainder at a temperature below incineration temperature but sufficiently high to drive off the volatile constituents, incinerating the remainder to ash and keeping the material in constant agitation during incineration, dissolving out the mineral salts from the ash, crystallizing the salts out from solution, and then distilling the iodin from the remaining liquid.

In witness that I claim the foregoing I have hereunto subscribed my name this 6th day of December, 1913.

JOHN W. CHENEY.

Witnesses:
  W. L. CONNOR,
  E. H. BARKELEW.